Figure 11:
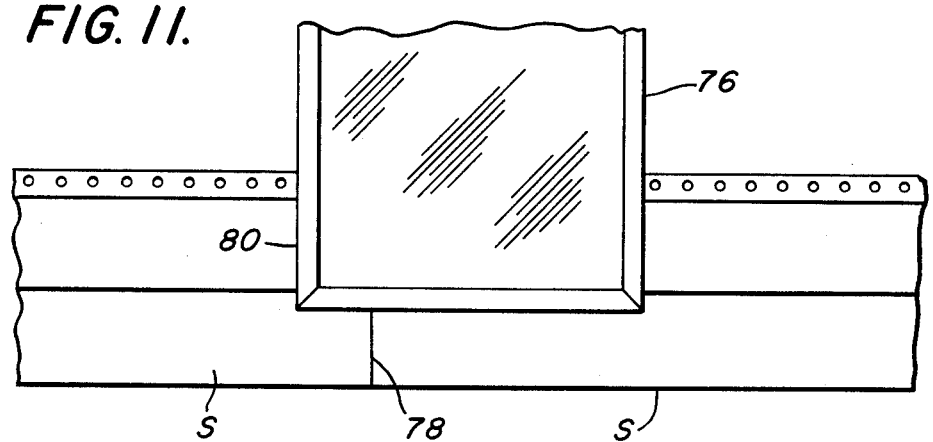

United States Patent [19]
Lang et al.

[11] 3,986,418
[45] Oct. 19, 1976

[54] SYSTEM FOR MAKING CUTOUTS AND ANGULAR CUTS IN STEPPED SIDING

[75] Inventors: John F. Lang, Homestead Borough; Robert A. Wilshire, Jr., Monroeville Borough, both of Pa.

[73] Assignee: United States Steel Corporation, Pittsburgh, Pa.

[22] Filed: Mar. 12, 1975

[21] Appl. No.: 557,734

[52] U.S. Cl. ................................ 83/41; 83/49; 83/628
[51] Int. Cl.² .................................... B26D 3/10
[58] Field of Search .................. 83/40, 41, 49, 628

[56] References Cited
UNITED STATES PATENTS

| | | | |
|---|---|---|---|
| 795,628 | 7/1905 | Lewis | 83/40 |
| 874,515 | 12/1907 | Lorenz | 83/40 |
| 2,233,000 | 2/1941 | Chesley | 83/49 |

*Primary Examiner*—Donald R. Schran
*Attorney, Agent, or Firm*—Rea C. Helm

[57] ABSTRACT

A system for making cutouts and angular cuts in stepped siding uses a punch to remove, at the desired cut location, a rectangular section including the step and a small portion of both faces adjacent the step. The punch operates in a shearing manner with cutting surfaces progressively contacting the siding as the punch is moved into the die. Final cuts of the siding are made with cutters which do not require support of the stepped portion of the siding.

3 Claims, 17 Drawing Figures

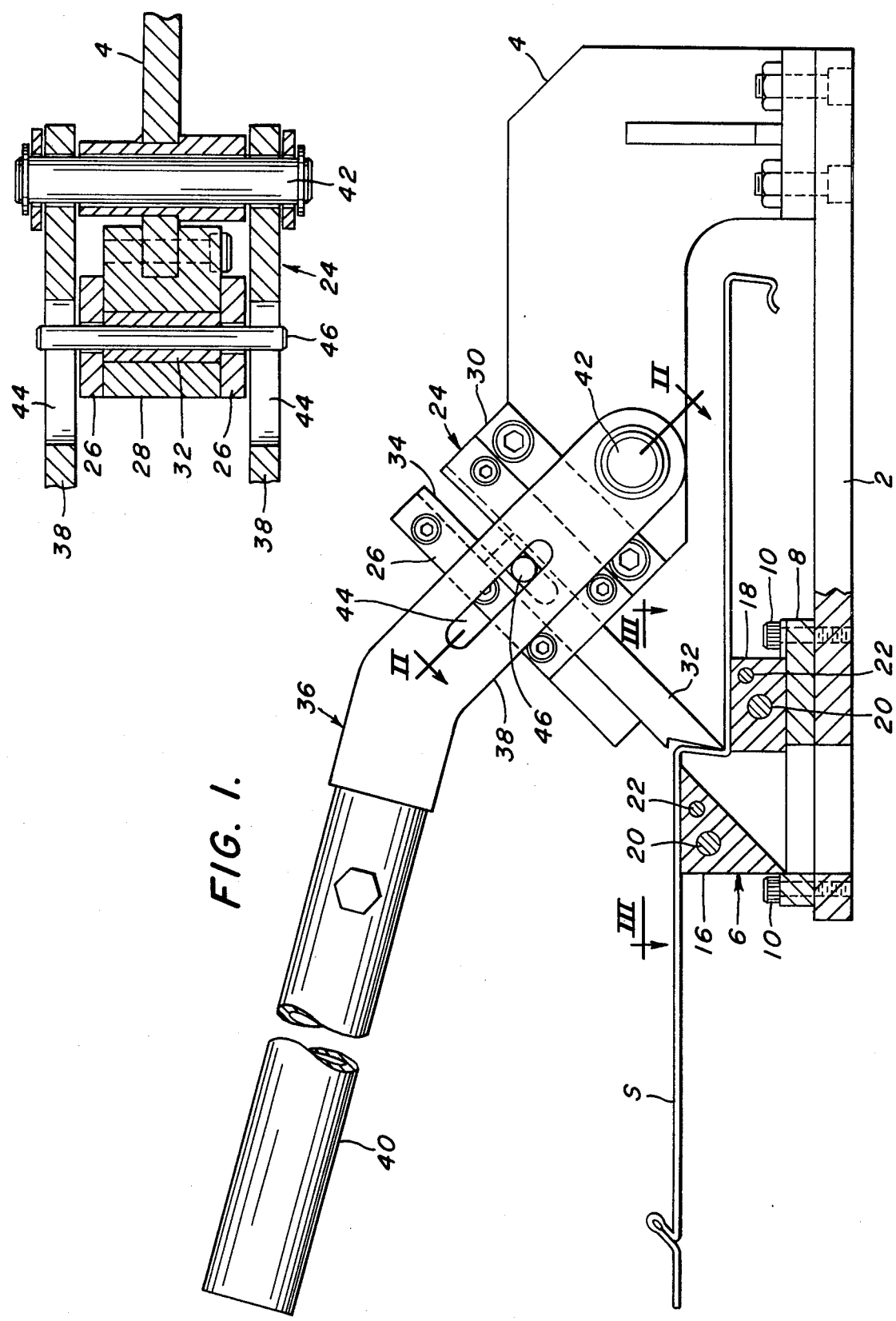

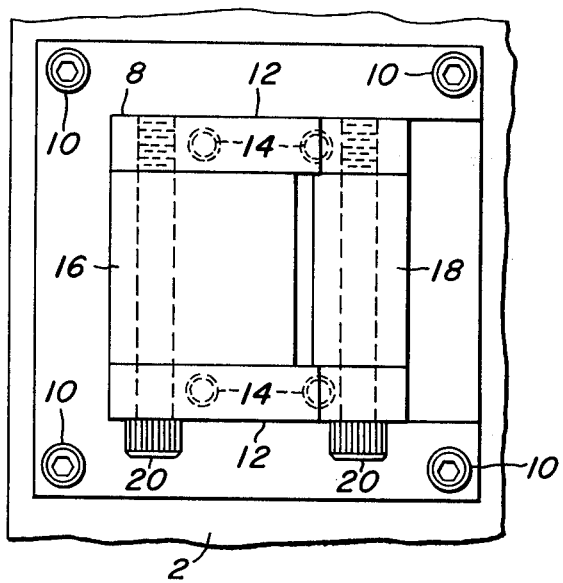
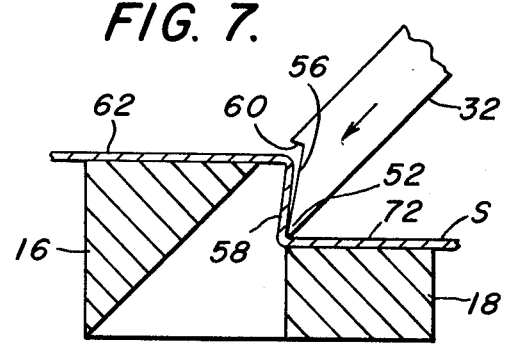
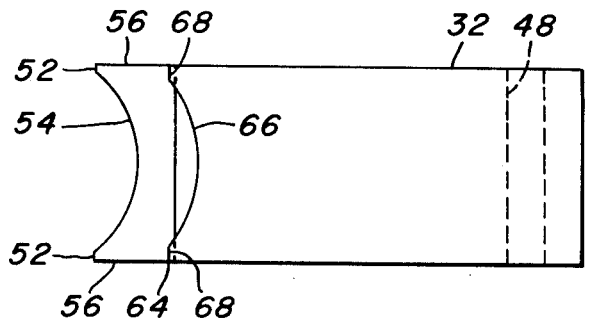
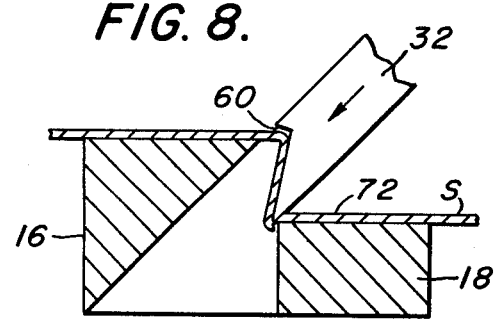
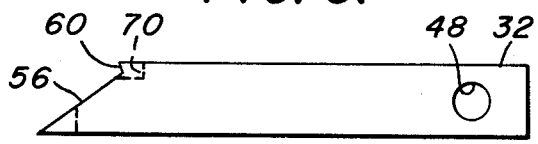
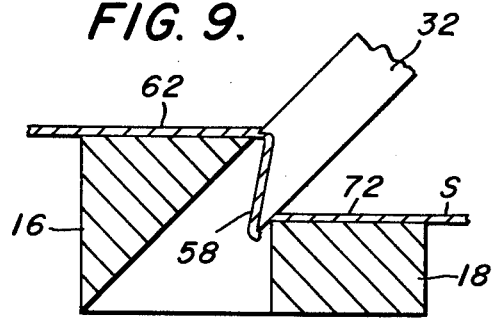
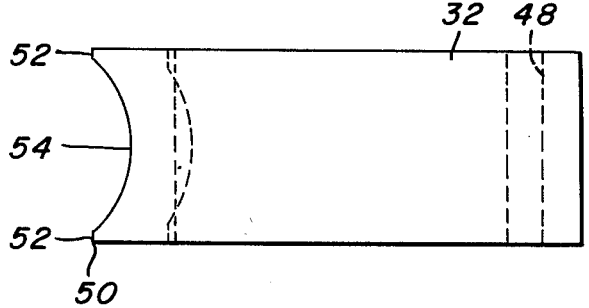
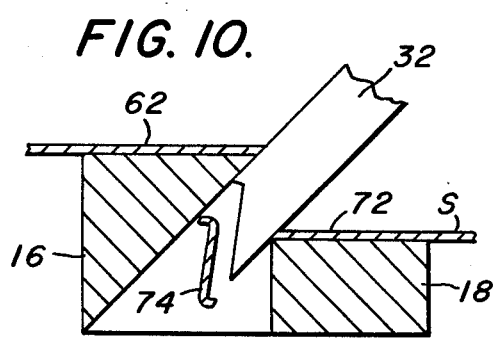

SYSTEM FOR MAKING CUTOUTS AND ANGULAR CUTS IN STEPPED SIDING

BACKGROUND OF THE INVENTION

This invention relates to a system for making angular cuts and cutouts in stepped siding used for application on the face of outer walls of buildings and more particularly to a method and apparatus for cutting metal stepped siding for fitting to gables and windows.

Prepainted galvanized steel siding is very desirable for the exterior surfaces of residential buildings because of its high strength, resistance to hail damage and low thermal coefficient of expansion. Flat siding is satisfactorily cut in the field, both angular and 90° cuts, with conventional tools. Siding with an intermediate stepped portion which gives the appearance of two courses of siding is difficult to cut because of problem supporting the material in shaped supporting dies for cutting. While 90° cuts across the face of stepped siding may be satisfactorily made with shaped supporting dies, angular cuts and cutouts often result in damaging or deforming the metal at the step when conventional shears are used.

In accordance with my invention, the location of an angular cut or a cutout is marked on the piece of siding being prepared for installation. The siding is then placed in a small, lightweight specially designed tool to remove a small rectangular piece of metal from the step at the mark. The tool includes a die shaped to fit the step of the siding and a punch shaped to cut the metal progressively in a shearing action which minimizes the force required to make the cut and tends to wipe the zinc coating over the edge of the steel to prevent edge rusting. A series of cuts aligned with the cutout are made with a conventional cutter to complete the cut.

It is therefore an object of our invention to provide a method of making cutouts or angular cuts on stepped siding which does not deform the metal.

Another object of our invention is to provide an apparatus that punches out a section of stepped siding including a portion of the step.

A further object of our invention is to provide an apparatus that punches out a section of stepped galvanized siding with a minimum of force and tends to wipe zinc coating over the cut edge.

Figure 12:
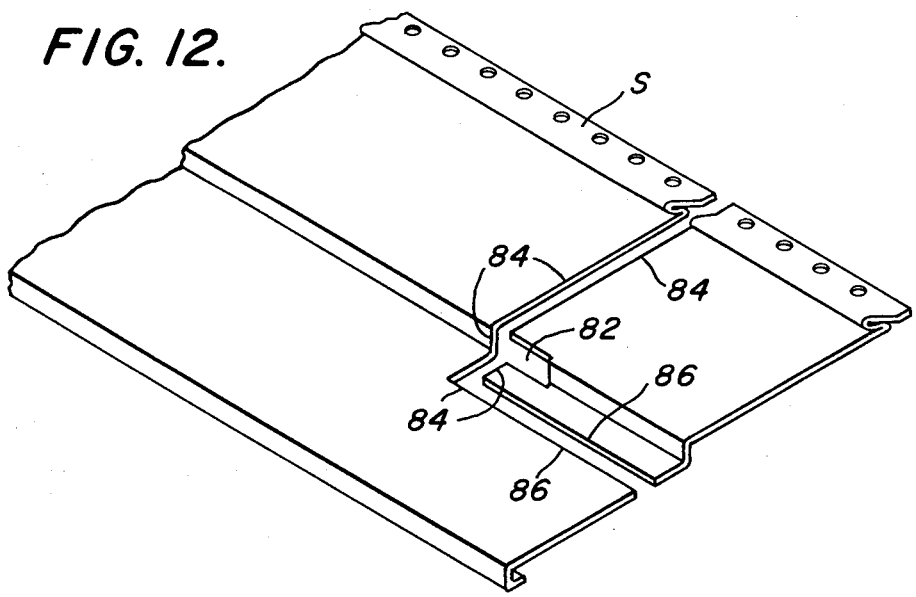
Figure 13:
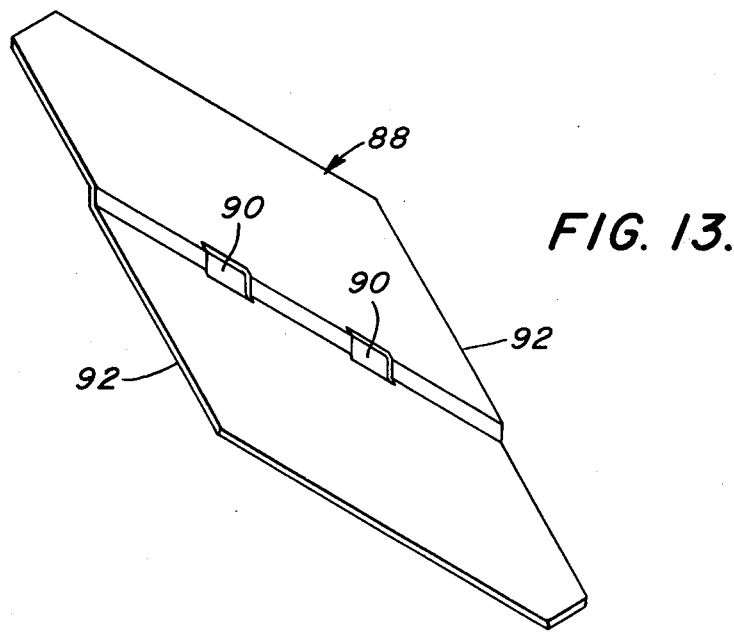
Figure 14:
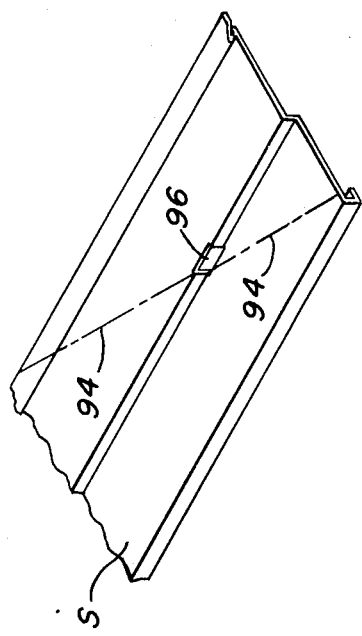
Figure 15:
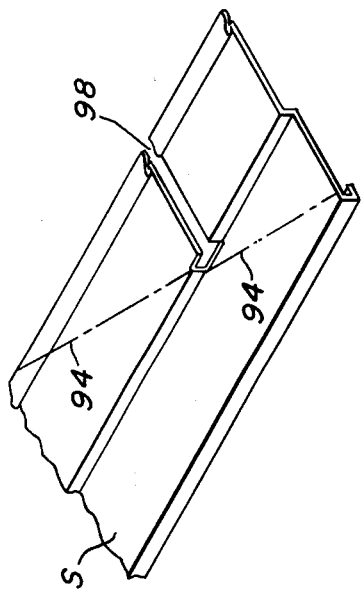
Figure 16:
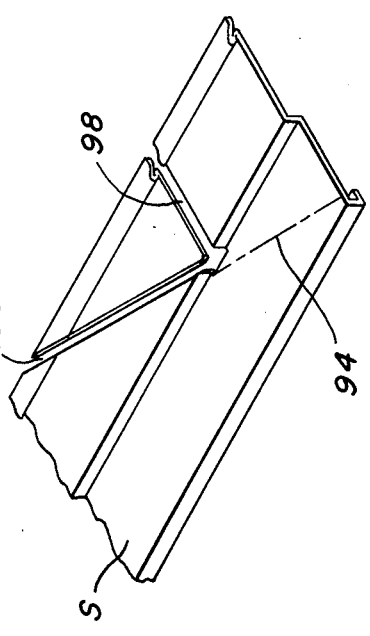
Figure 17:
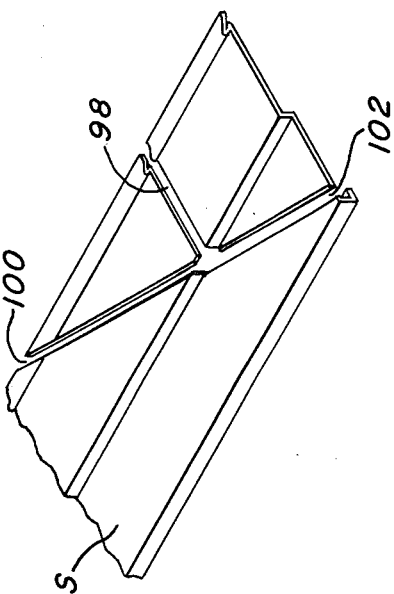

These and other objects will be more apparent after referring to the following specification and drawings in which FIG. 1 is a side elevation of the notching apparatus of our invention, FIG. 2 is a section along line II—II of FIG. 1, FIG. 3 is a section along line III—III of FIG. 1, FIG. 4 is a top of the punch of the apparatus of our invention, FIG. 5 is a side view of the punch of the apparatus of our invention, FIG. 6 is a bottom view of the punch of the apparatus of our invention, FIG. 7 is a sectional view of the punch and die illustrating the first step of the punch cutting the bottom of the rectangular cutout, FIG. 8 is a sectional view of the punch and die illustrating the second step of the punch cutting the sides of the rectangular cutout, FIG. 9 is a sectional view of the punch and die illustrating the third step of the punch cutting out the top of the rectangular cutout, FIG. 10 is a sectional view of the punch and die illustrating the completed punch, FIG. 11 is an illustration of siding cutout around the bottom of a window, FIG. 12 is an illustration of the steps of making the cutout for FIG. 11, FIG. 13 is a perspective view of a template used for making angular cuts, FIG. 14 is a perspective view illustrating the first cut in making an angular cut, FIG. 15 is a perspective view illustrating the second cut in making an angular cut, FIG. 16 is a perspective view illustrating the third cut in making an angular cut and FIG. 17 is a perspective view illustrating the fourth cut in making an angular cut, Referring now to FIGS. 1, 2, and 3, the apparatus of our invention, reference numeral 2 refers to a base plate upon which is mounted one end of a support frame 4 and a die block assembly 6. Die block assembly 6 has a bottom plate 8 secured to base plate 2 by screws 10. Two side plates 12 are secured to plate 8 by screws 14. Side plates 12 are contoured to fit the exact shape of stepped siding S at the step. An upper end block 16 with a 45° triangular cross section (FIG. 1) and a lower end block 18 with a rectangular cross section (FIG. 1) are held in place between side plates 12 by screws 20 and locating pins 22.

A punch guide assembly 24 is mounted on the other end of frame 4 and has two side plates 26, an upper plate 28 and a lower plate 30 bolted together to form a guideway for punch 32 inclined at an angle of about 47° from the horizontal. The guide may be inclined at other angles so long as there is an adequate relief angle between punch 32 and upper end block 16. An angle of about 45° is preferred. A slot 34 is located in each side plate 26.

An operating handle assembly 36 has two side plates 38 joined at one end to handle 40 and pivotably connected to support frame 4 at the other end by a pivot pin 42 mounted on support 4. Side plates 38 have slots 44 to accommodate a drive pin 46. Drive pin 46 operates in slots 44 and slots 34 and is inserted in a hole 48 of punch 32.

Referring now to FIGS. 4, 5, and 6, punch 32 is a hardened steel block closely fitting into the opening in punch guide assembly 24. Punch 32 has a bottom cutting edge 50 with a pair of penetrating points 52 and a curved portion 54. The penetrating points 52 should have a minimum width for structural soundness and the radius of curvature may be any convenient curvature so that the cutting of the bottom edge is completed before the cutting of the step begins. The side cutting edges 56 are inclined at angle so that when in position for cutting there is about a 5° angle between the edge 56 and the supported step of the siding 58 as shown in FIG. 7. The upper end of edge 56 ends in a small projection 60 which cuts the bend of the siding from step portion 58 to flat portion 62 as best shown in FIG. 9. Projection 60, when in position for cutting, is inclined at an angle of about 10° from the horizontal as best shown in FIG. 7. Punch 32 also has a top cutting edge 64 having a curved portion 66 and a pair of end penetrating points 68. The geometry of top cutting edge 64 is the same as bottom cutting edge 50. Cutout 70 is provided in the end of punch 32. Punch 32 fits snugly between side plates 12, upper end block 16 and lower end block 18. The punch and die size should be large enough to cut out a small portion of the flat upper portion 62 of siding S and a small portion of the flat lower portion 72 of siding S. The width of the cut should be about two to three times the height of step 58 but at least wide enough to allow for the use of strip removing shears on angular cuts.

To use the punch of our invention, a piece of siding S is placed in position resting on side plates 12. Handle 40 is moved downward forcing drive pin 46 downward. This moves punch 32 downward until penetrating points 52 contact the siding as shown in FIG. 7. At this point, additional force is required on handle 40 for points 52 to penetrate the siding. Once points 52 have penetrated the siding, continued movement of punch 32 will cause curved portion 54 to cut the balance of the flat lower portion. The action of the curved surface 54 and the edge of block 18 is a shearing operation instead of the typical blanking operation of a conventional punch and die. Blanking operation typically cut through metal partially and tear or break through the balance of the metal leaving rough exposed edges. The shearing action of edge 54 and the edge of lower block 18 provides a clean cut and wipes zinc coating over the edge of the cut to prevent rusting at the exposed edge.

While the punch is cutting along cutting edge 50 and lower block 18, cutting edge 56 is also cutting a small amount of flat portion 72 along the edge of side plates 12, again in a shearing rather than a blanking mode. When the cutting along edge 50 is complete, the step portion 58 is sheared by action of cutter 56 along the vertical portions of side plates 12 as shown in FIG. 7. Shearing action is caused by the angle between edge 56 and the vertical edge of side plate 12. Punch 32 moves until projection 60 contacts the face 62 of siding S, and because of its angle with respect to the upper edge of side plates 12, will shear a small portion of the siding as shown in FIG. 9.

At this position of travel of punch 32, the bottom and sides have been cut and continued downward movement brings penetration points 68 in contact with the flat upper portion 62. The cut is completed by continued movement of punch 32 with the curved portion 66 acting as a shear similar to curved portion 54. FIG. 10 illustrates the position of the punch 32 just when the cutting is complete and the blank piece 74 falls out.

The cutting of the hole progressively, first the bottom edge, then the sides and finally the top edge, all in a shearing mode, requires a minimum of manual effort as compared to blanking, and wipes zinc over all the edges.

Referring now to FIGS. 11 and 12, illustrating the method of my invention in making a cutout, in FIG. 11 it is desired to make a cutout in the siding to accommodate a window frame 76. As illustrated, there is a joint 78 between two lengths of siding at the window location. In FIG. 12, the method of cutting the left hand piece of siding is illustrated. First the location of edge 80 is marked on the siding at the step location. Rectangular section 82 is then punched out with the punch just described with the left edge aligned on mark 80. Next a cut is made along lines 84 using a strip removing shear cutter of the type described in Hall et al, U.S. Pat. No. 3,714,856. Finally, another cut is made along lines 86 thereby completing the cutout. The use of the Hall cutter is preferred, but other cutters, including conventional hand tin snips, could also be used.

FIG. 13 illustrates a template which may be used in making angular cuts to fit siding to gables. Template 88 is fabricated from a piece of scrap stepped siding and, as illustrated, has two punch outs 90 and angled sides 92. The angled sides are cut for a particular desired roof pitch and the two holes are conveniently spaced, one for use with "double 5" siding where each section is about five inches high and the other for use with "double 4" siding where each section is about four inches high.

Referring now to FIGS. 14, 15, 16 and 17, the first step in making an angular cut is to mark the siding where the cut is desired. Template 88 may be used to locate the desired cut line 94. Next the punch is used to remove a rectangular section 96 with one edge on cut line 94. Next, FIG. 15, a cut 98 is made from the edge of the siding to the rectangular cutout 96. Cut 98 and subsequent cuts are shown as being made by the Hall et al type cutter where a narrow strip is removed. Tin snips could also be used. Next, in FIG. 16, an angular cut 100 is made removing a triangular section of siding. Finally, in FIG. 17, another angular cut 102 is made to complete the angular cut of the siding. It may be convenient to perform cuts from either face of the siding since the step does not need support.

This method is fast, simple, requires a minimum of manual effort and does not damage the siding at the step.

While we have described a preferred embodiment of our invention, other modifications and adaptations may be made within the scope of the following claims.

We claim:
1. A method of making cutouts or angular cuts in stepped siding which comprises the steps of placing a line on the siding where it is desired to cut the siding, punching out a rectangular section of siding including the step and a small portion of both faces adjacent the step so that one edge of the rectangle that crosses the step is along the line, and cutting the siding along the line between the rectangular cutout and an edge of the siding.

2. A method according to claim 1 in which a cut extends beyond the step towards the other edge of the siding and which includes the additional step of making a cut between an end of the siding and the cut along the line thereby defining a cutout.

3. A method according to claim 1 in which the line is placed on the siding with the use of a template having edges cut for desired roof pitches and cutouts spaced for desired siding size and in which at least two cuts are made along a line running from one edge of the siding to the other edge of the siding thereby defining an angular cut.

* * * * *